United States Patent
Sobolak et al.

(10) Patent No.: US 10,533,647 B2
(45) Date of Patent: Jan. 14, 2020

(54) LOCKING AND UNLOCKING MECHANISM

(71) Applicant: Hamilton Sundstrand Corporation, Charlotte, NC (US)

(72) Inventors: Piotr Sobolak, Slupsk (PL); Izabela Pawelec, Wieluń (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 304 days.

(21) Appl. No.: 15/443,162

(22) Filed: Feb. 27, 2017

(65) Prior Publication Data

US 2017/0314657 A1   Nov. 2, 2017

(30) Foreign Application Priority Data

Apr. 30, 2016   (EP) .................................... 16461519

(51) Int. Cl.
| | |
|---|---|
| *B64D 41/00* | (2006.01) |
| *F16H 25/20* | (2006.01) |
| *F01D 25/28* | (2006.01) |
| *G05G 5/12* | (2006.01) |

(52) U.S. Cl.
CPC ....... *F16H 25/2025* (2013.01); *B64D 41/007* (2013.01); *F01D 25/28* (2013.01); *G05G 5/12* (2013.01); *F05D 2220/34* (2013.01)

(58) Field of Classification Search
CPC ... F16H 25/2025; B64D 41/007; F01D 25/28; G05G 5/12; F05D 2220/34
See application file for complete search history.

(56) References Cited

U.S. PATENT DOCUMENTS

| | | | | |
|---|---|---|---|---|
| 2,847,869 | A | | 8/1958 | Hogan et al. |
| 4,250,762 | A | * | 2/1981 | Weatherby .......... F16H 25/2015 74/89.38 |
| 4,630,866 | A | * | 12/1986 | McFarlane ............. A47C 1/024 185/39 |
| 5,048,656 | A | * | 9/1991 | Braun .................... B60T 17/16 192/114 R |

(Continued)

FOREIGN PATENT DOCUMENTS

WO   9419606 A1   9/1994

OTHER PUBLICATIONS

European Search Report for International Application No. 16461519.7, dated Nov. 29, 2016, 8 pages.

*Primary Examiner* — Vicky A Johnson
(74) *Attorney, Agent, or Firm* — Cantor Colburn LLP

(57) ABSTRACT

A locking mechanism for releasably locking a lock bolt against axial movement, the mechanism comprising an axially moveable member, arranged to move axially with the lock bolt biasing means, arranged to bias the piston towards the lock bolt; rotation means in threaded engagement with the piston such that rotation of the rotation means causes axial movement of the piston, and a solenoid assembly arranged to prevent rotation of said rotation means in a locked state, the solenoid assembly comprising: a solenoid plunger having a solenoid tip and a solenoid arranged to cause movement of the solenoid plunger relative to the rotation means, the solenoid assembly arranged such that in a locked state the solenoid causes the solenoid tip to engage with the rotation means such as to prevent rotation thereof, thus preventing axial movement of the piston.

13 Claims, 8 Drawing Sheets

(56) References Cited

U.S. PATENT DOCUMENTS

| | | | | |
|---|---|---|---|---|
| 5,288,037 | A * | 2/1994 | Derrien | B64C 25/26 |
| | | | | 244/102 SL |
| 5,970,812 | A * | 10/1999 | Fan | B23Q 5/408 |
| | | | | 269/181 |
| 6,832,540 | B2 * | 12/2004 | Hart | F15B 15/2807 |
| | | | | 92/24 |
| 8,640,563 | B2 * | 2/2014 | Lang | B64D 41/007 |
| | | | | 74/89.39 |
| 9,193,472 | B2 | 11/2015 | Sasscer | |
| 2013/0327207 | A1 | 12/2013 | Sasscer et al. | |
| 2015/0096437 | A1 | 4/2015 | Russ | |
| 2015/0167702 | A1 * | 6/2015 | Ozanich | F15B 15/261 |
| | | | | 92/27 |
| 2015/0232195 | A1 | 8/2015 | Bannon | |
| 2017/0203853 | A1 * | 7/2017 | Sobolak | B64D 41/007 |
| 2017/0204950 | A1 * | 7/2017 | Sobolak | B64D 41/007 |
| 2017/0371368 | A1 * | 12/2017 | Kielczykowski | B64D 41/007 |
| 2018/0038349 | A1 * | 2/2018 | Hilgier | F03D 9/32 |
| 2018/0052484 | A1 * | 2/2018 | Sobolak | G05G 5/08 |

* cited by examiner

LOCKING AND UNLOCKING MECHANISM

FOREIGN PRIORITY

This application claims priority to European Patent Application No. 16461519.7 filed Apr. 30, 2016, the entire contents of which is incorporated herein by reference.

TECHNICAL FIELD

The present disclosure relates to locking/unlocking mechanisms for deployable components. The mechanism is particularly suitable as an unlocking mechanism for a ram air turbine (RAT) actuator but could also find application in other deployable or movable systems such as other actuators, valves, pumps and the like.

BACKGROUND

Many systems and mechanisms are known in which a component is movable between a closed or stowed position and an open or deployed position, and wherein a component should be locked in the desired position and unlocked to permit movement between the positions. Particular examples are valves or actuators, such as RAT actuators as described in more detail below.

Locking mechanisms are known to secure the actuator, valve etc. in a particular position, and unlocking mechanisms are known to release the locking mechanism and permit movement of the actuator/valve components to a different position, whereupon the actuator components can then also be locked in the second position by means of a locking mechanism. A locking mechanism for a RAT actuator is disclosed, for example, in US 2013/0327207.

Ram air turbines are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn, due to the airflow, and generates electrical and/or hydraulic power. The RAT is typically pivoted into position by means of an actuator, for example a hydraulic actuator. The actuator typically includes a lock bolt which extends to deploy the RAT. The actuator has a lock mechanism which prevents inadvertent movement of the lock bolt and, thus, inadvertent deployment of the RAT. The main locking mechanism typically comprises a spring loaded lock bolt which must be moved in an axial direction to unlock the actuator. Such an actuator is disclosed, for example, in US 2015/0232195. RAT actuators are also disclosed in U.S. Pat. No. 8,640,563, U.S. Pat. No. 9,193,472 and US 2015/0096437.

An unlocking mechanism is provided to permit the axial bolt movement. A conventional unlocking mechanism is shown, for example, in FIGS. 2A and 2B, comprising a linkage arrangement, one end of which is rotatably coupled to one end of the lock bolt and the other end of which is axially fixed and rotatably coupled to, for example, a mounting wall. A solenoid moves the link between a locked (FIG. 2A) and an unlocked (FIG. 2B) position. In the locked position, the linkage assembly pushes against the lock bolt against the force of the lock bolt spring to prevent axial movement of the lock bolt. When it is required to deploy the RAT, the lock bolt needs to be released for axial movement of the actuator. As seen in FIG. 2B, a pull force, greater than the spring force, is exerted on the linkage assembly by means of a solenoid, which moves the linkage assembly out of engagement with the lock bolt. This allows the lock bolt to move axially to initiate actuator unlocking to permit deployment. The solenoid must have sufficient force to displace the lock bolt against the force of the lock bolt spring and the linkages and joints require sufficient axial and radial space and may also be prone to wear or damage.

The size and weight of components is of particular concern in aircraft where there is a desire to use lighter and smaller components, whilst maintaining safety and reliability.

There is a desire, therefore, to provide a locking/unlocking mechanism for such systems to prevent/permit axial movement of a component such as a lock bolt, without the need for such large solenoids and a series of links.

SUMMARY

The present invention provides a locking mechanism for releasably locking a lock bolt against axial movement, the mechanism comprising:

an axially moveable member, arranged to move axially with the lock bolt;

biasing means, arranged to bias the axially moveable member towards the lock bolt;

rotation means in threaded engagement with the piston such that rotation of the rotation means causes axial movement of the piston, and an actuator assembly arranged to prevent rotation of said rotation means in a locked state, the actuator assembly comprising:

a plunger having a tip and a drive means arranged to cause movement of the plunger relative to the rotation means, the actuator assembly arranged such that in a locked state the drive means causes the tip to engage with the rotation means such as to prevent rotation thereof, thus preventing axial movement of the piston.

The actuator assembly is preferably a solenoid assembly having a solenoid plunger driven by a solenoid.

In a preferred embodiment, the mechanism comprises two such solenoid assemblies. The disclosure also provides an actuator assembly comprising a lock bolt and such a locking mechanism.

BRIEF DESCRIPTION OF THE DRAWINGS

Preferred embodiments will now be described by way of example only and with reference to the accompanying drawings in which.

DETAILED DESCRIPTION

Figure 1:
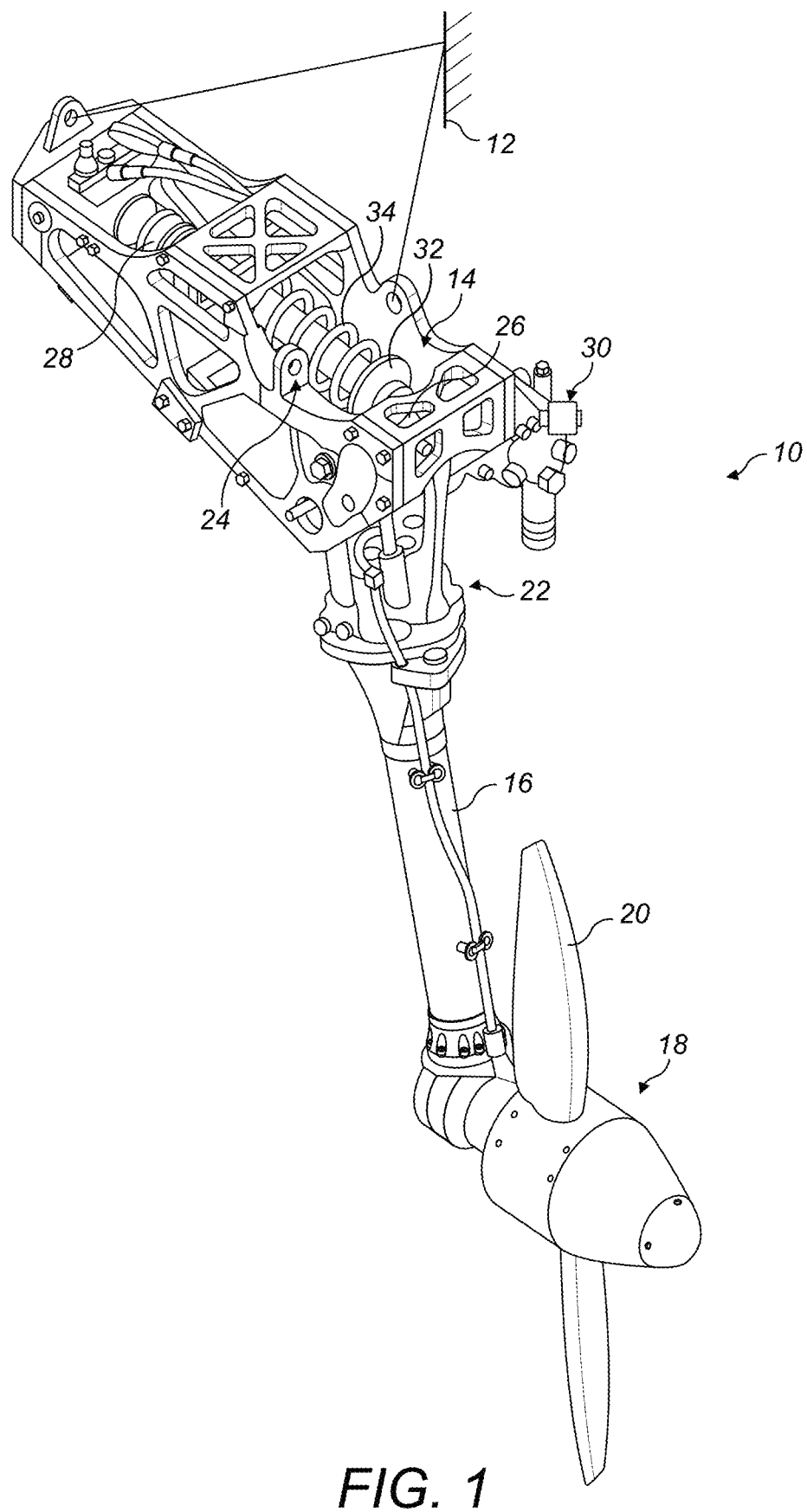
FIG. 1 shows a ram air turbine (RAT)

FIG. 1 shows a RAT system 10 which is secured to an aircraft structure 12 by housing 14. The housing 14 pivotally supports a strut 16 having a turbine 18 at one end. The turbine 18 includes blades 20 which impart rotational drive to a generator 22 and a hydraulic pump 30, for example. An actuator 24 is secured to the strut at a first end 26 and to the housing at a second end 28. The actuator 24 is illustrated in its deployed position. The actuator 24 comprises a cylinder 32 which is biased by a spring 34 in order to deploy the strut 16. When the cylinder 32 is retracted, it is held in its retracted position by means of a lock bolt of a locking mechanism, details of which will be described below.

The unlocking of the actuator is initiated by permitting movement of the lock bolt 38. This is made possible by means of a release mechanism according to the present disclosure which will be described further below.

Figure 2A:
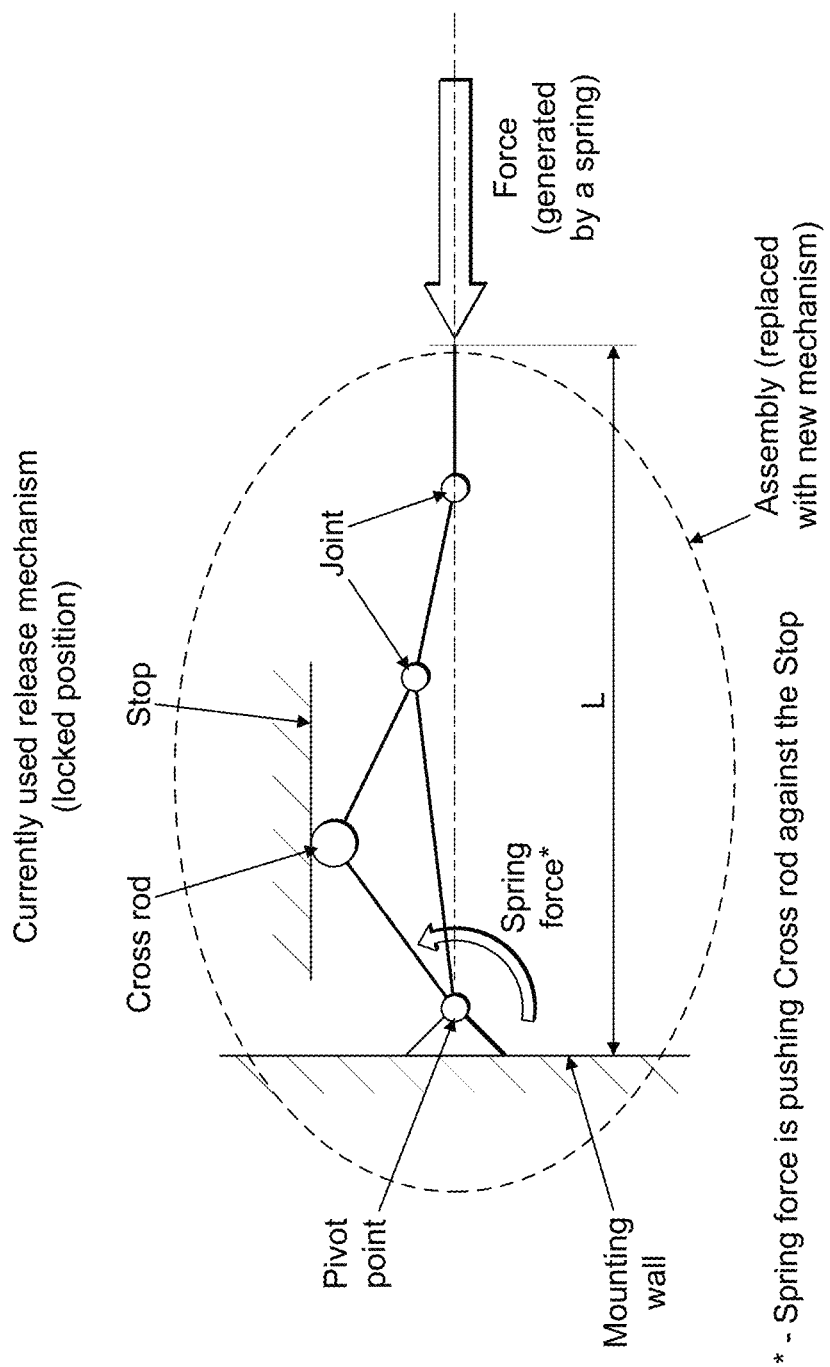
FIG. 2A shows a schematic view of a typical linkage release mechanism in the locked position.
Figure 2B:
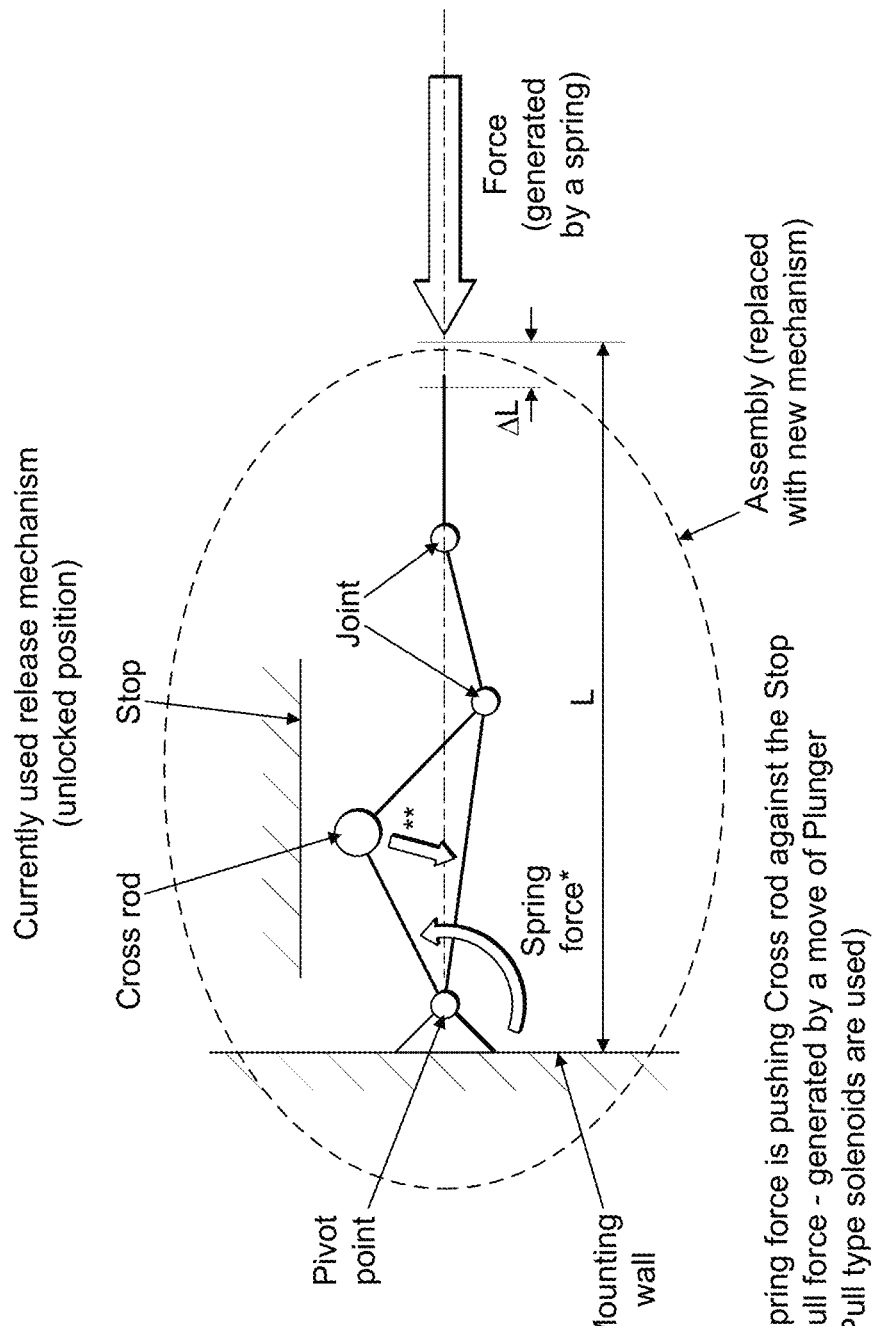
FIG. 2B shows the mechanism of FIG. 2A in the unlocked position.
Figure 3B:
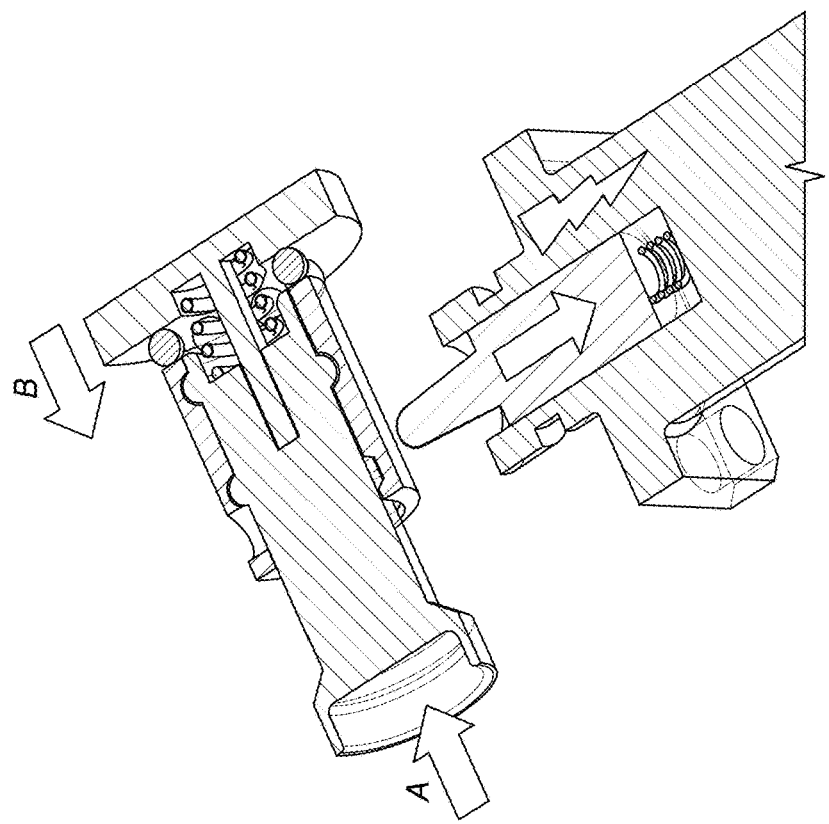
FIGS. 3A and 3B show a section view of the piston, cylinder and spring arrangement of the actuator lock bolt, which would replace the conventional mechanism shown within the dashed lines of FIGS. 2A and 2B.
Figure 3A:
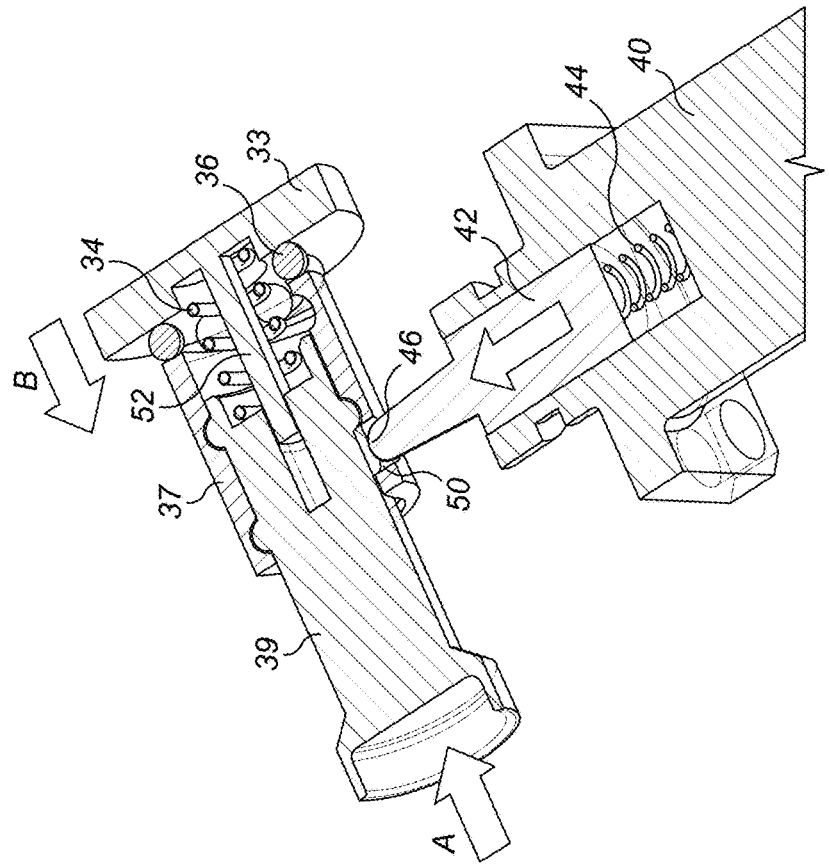

FIGS. 3A and 3B show a section view of the piston, cylinder and spring arrangement of the actuator lock bolt, and the release mechanism which would replace the conventional, linkage-type mechanism shown within the dashed lines of FIGS. 2A and 2B.

FIG. 3A shows the piston 39 in the locked position and, in FIG. 3B, in the unlocked position permitting movement of the bushing and the piston 39 and, thus, the lock bolt for deployment of the actuator, this can be realised due to the fact that the lock bolt spring force is greater than the piston spring force.

Figure 4A:
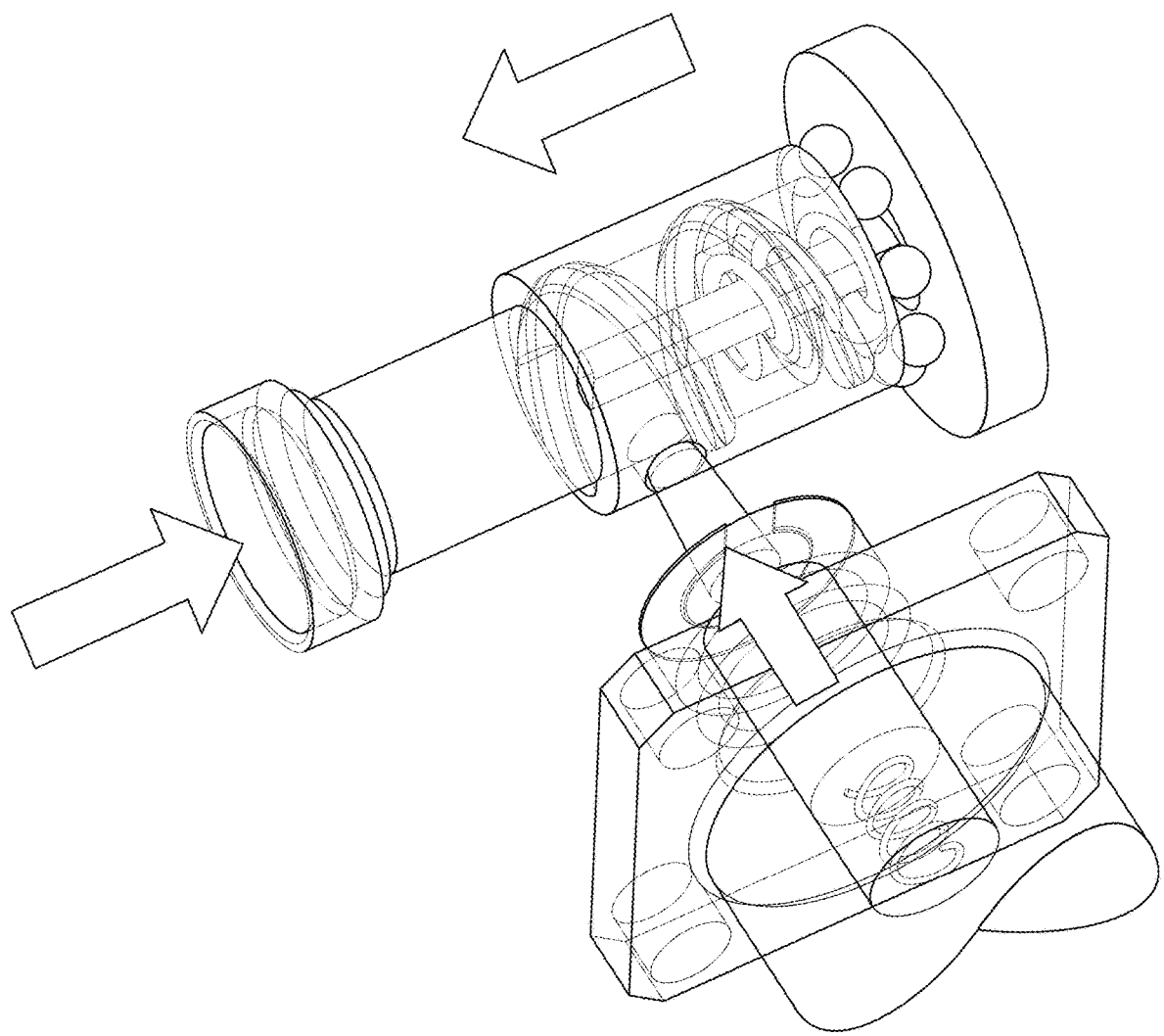
FIGS. 4A and 4B show the components of FIGS. 3A and 3B in a perspective view.
Figure 4B:
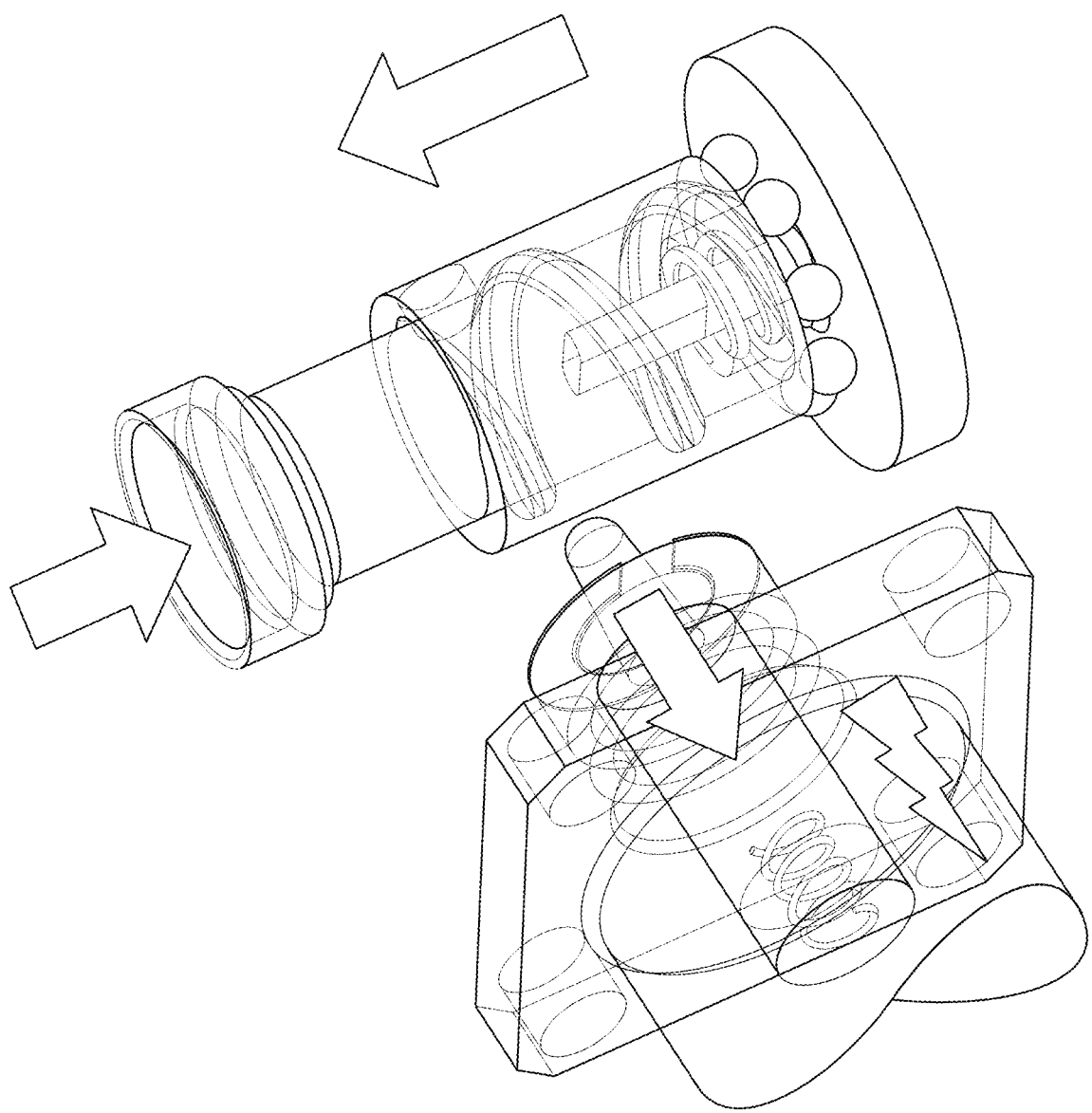
Figure 5B:
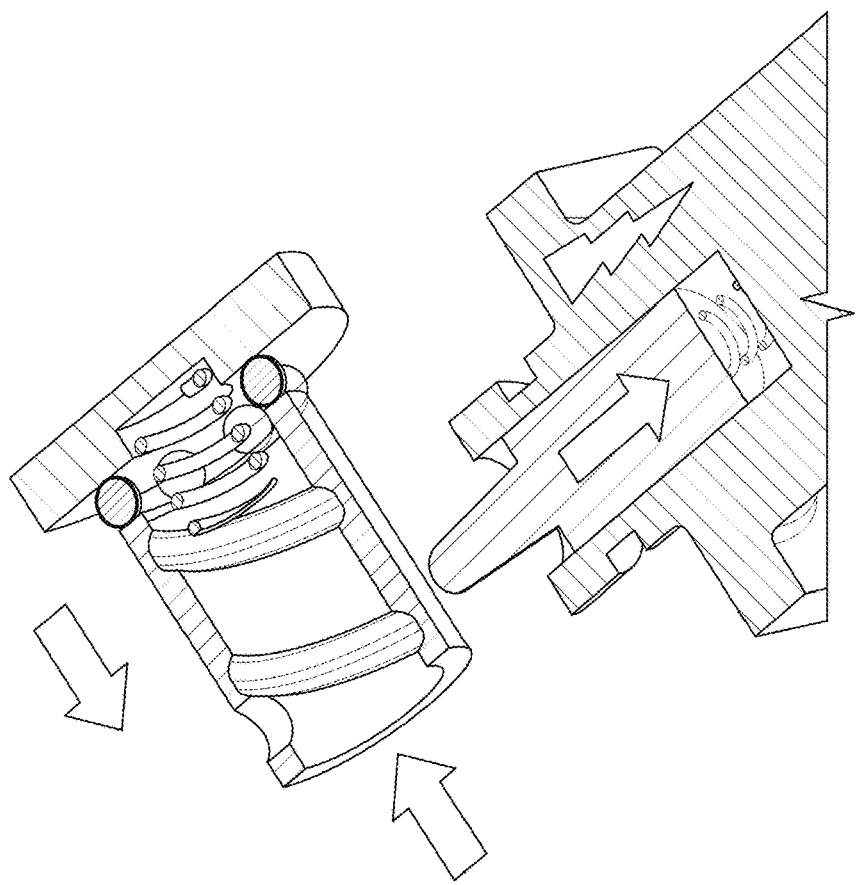
FIGS. 5A and 5B show a detailed section view of the locking mechanism of FIGS. 4A and 4B.
Figure 5A:
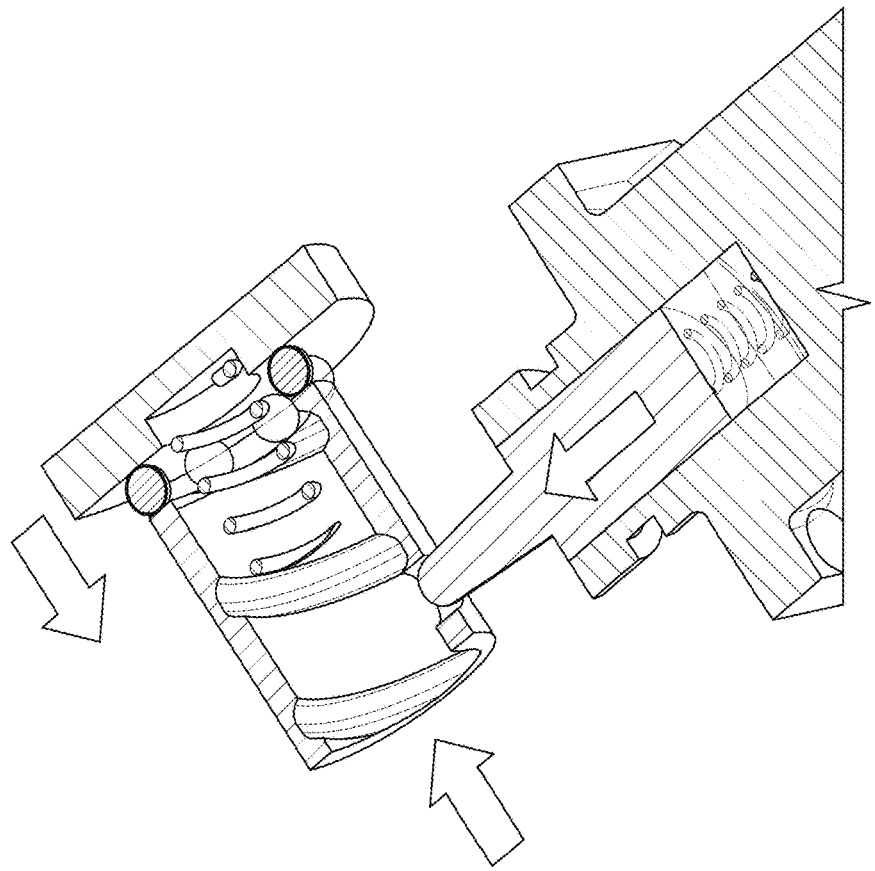

FIGS. 4A and 4B show the components of FIGS. 3A and 3B in a schematic view. FIGS. 5A and 5B show the locking mechanism in more detail.

The locking mechanism of embodiments of the disclosure will be described in detail with reference to these drawings, by way of example only. The scope of the invention is determined by the claims.

As mentioned above, to deploy the RAT, a lock bolt 38 needs to move axially under the control of a hydraulic actuator system (not shown). In the locked position, when the RAT is not deployed, the lock bolt is biased by means of a lock bolt spring (not shown) in the direction of arrow A. The lock bolt is prevented from moving axially by means of a piston 39 biased by a piston spring 34 in the direction of arrow B. The locked position requires the piston 39 to be retained in its biased position relative to the lock bolt 38 so that the force of the lock bolt spring is not able to counteract the force of the piston spring 34 and push the piston against the direction of arrow B. If the piston is secured against movement against the direction of arrow B, then the lock bolt is unable to move axially in that direction.

The piston is secured in its biased position by means of a tip e.g. a solenoid plunger tip, engaging with a bushing 37 around the piston so as to prevent rotation of the bushing which allows axial movement of the piston, as will now be described in more detail.

Bushing 37 is provided around at least the end of the piston 39 furthest from the lock bolt 38 and is in threaded engagement with the piston 39. The bushing 37 is supported by a bearing 36 against the assembly housing 33. A piston spring 34 is provided within the bushing 37. The piston spring 34 is supported at one end by the piston 39 and at the other end by the assembly housing 33. A detent 50 such as a recess, hole or dent, is provided in the wall of the bushing 37.

The locking mechanism further comprises an actuator assembly which is preferably a solenoid assembly comprising a solenoid 40 having a solenoid plunger 42 and a solenoid bias spring 44 the solenoid plunger having a solenoid plunger tip 46 arranged to engage with the bushing 37. Other actuators are also envisaged.

In the examples shown, when the solenoid is de-energised, the solenoid bias spring biases the solenoid plunger in an extended position in which the solenoid plunger tip extends into engagement with the bushing, preferably engaging it in a recess or detent in or on the bushing 37, to prevent axial movement of the lock bolt.

When the solenoid is energised (FIG. 4B), the solenoid plunger (which is ferromagnetic) retracts due to magnetic field force creation in the solenoid, therefore the solenoid biased spring contracts and, hence, draws the solenoid plunger tip out of engagement with the bushing 37, thus permitting axial movement of the piston and the lock bolt 38, against the spring 34 force as will be described further below.

In the locked position, as shown in FIGS. 3A, 4A and 5A the lock bolt 38 is acting, in the direction of arrow A under the bias of the lock bolt spring (not shown) on the piston 39. That force acting on the piston is transmitted to the rotary bushing 37. The bushing engages with the piston by a helical engagement e.g. a thread or roll guide. Due to this helical engagement, the force from the lock bolt is distributed on the thread contact surface i.e. between the piston and the bushing and the bearing 36. The ratio of force distribution depends on the pitch of the helical thread. The force causes rotation of the bushing 37. Rotation of the bushing would cause axial or linear movement of the piston 39 due to the threaded engagement. In the locked position, however, this reactionary rotation of the bushing to the force of the lock bolt is prevented by action of the solenoid assembly. More specifically, in the embodiment shown, the solenoid is a pull-type solenoid, and in the locked state the solenoid is deenergised. The force of the solenoid bias spring 44 thus causes the plunger 42 to extend towards the bushing until the solenoid tip 46 engages with the bushing e.g. in the detent 50 preventing rotation of the bushing. The retaining force of the tip and detent is greater than the rotation force transmitted by the lock bolt acting on the piston.

To deploy the RAT, the lock bolt 38 needs to be able to move axially or linearly which means that the piston and, hence the bushing, needs to be released. To release the piston, the solenoid 40 is energised, as seen in FIGS. 3B, 4B and 5B. This cases the solenoid plunger 42 to be pulled away from the piston assembly and thus out of engagement with the bushing 37. The forces acting on the threaded engagement, due to the force of the lock bolt acting in the direction of arrow A, and this force exceeding the force of the piston spring acting in the direction of arrow B, allows the bushing to rotate relative to its own axis. This rotation causes linear movement of the piston 39, due to the threaded engagement between the bushing and the piston. As the lock bolt force in the direction of arrow A is greater than the force of the piston spring 34 in the direction of arrow B, the lock bolt and piston can move together axially in the direction of arrow A, compressing the piston spring 34.

To return to the locked position, force is removed or reduced from the lock bolt 38 in the direction of arrow A by the actuator hydraulics (not shown). The force of the compressed piston spring 34 is then able to push the piston back in the direction of arrow B which, in turn, causes rotation of the bushing 37. At this time, the solenoid is deenergised so that the solenoid plunger tip is in contact with the rotating bushing surface and, as the detent rotates to the position where the tip is, the tip engages with the detent, thus locking the bushing against rotation and, thus, the piston against further linear movement. The piston is then again in the position where it prevents the lock bolt 38 from moving axially.

Figure 6:
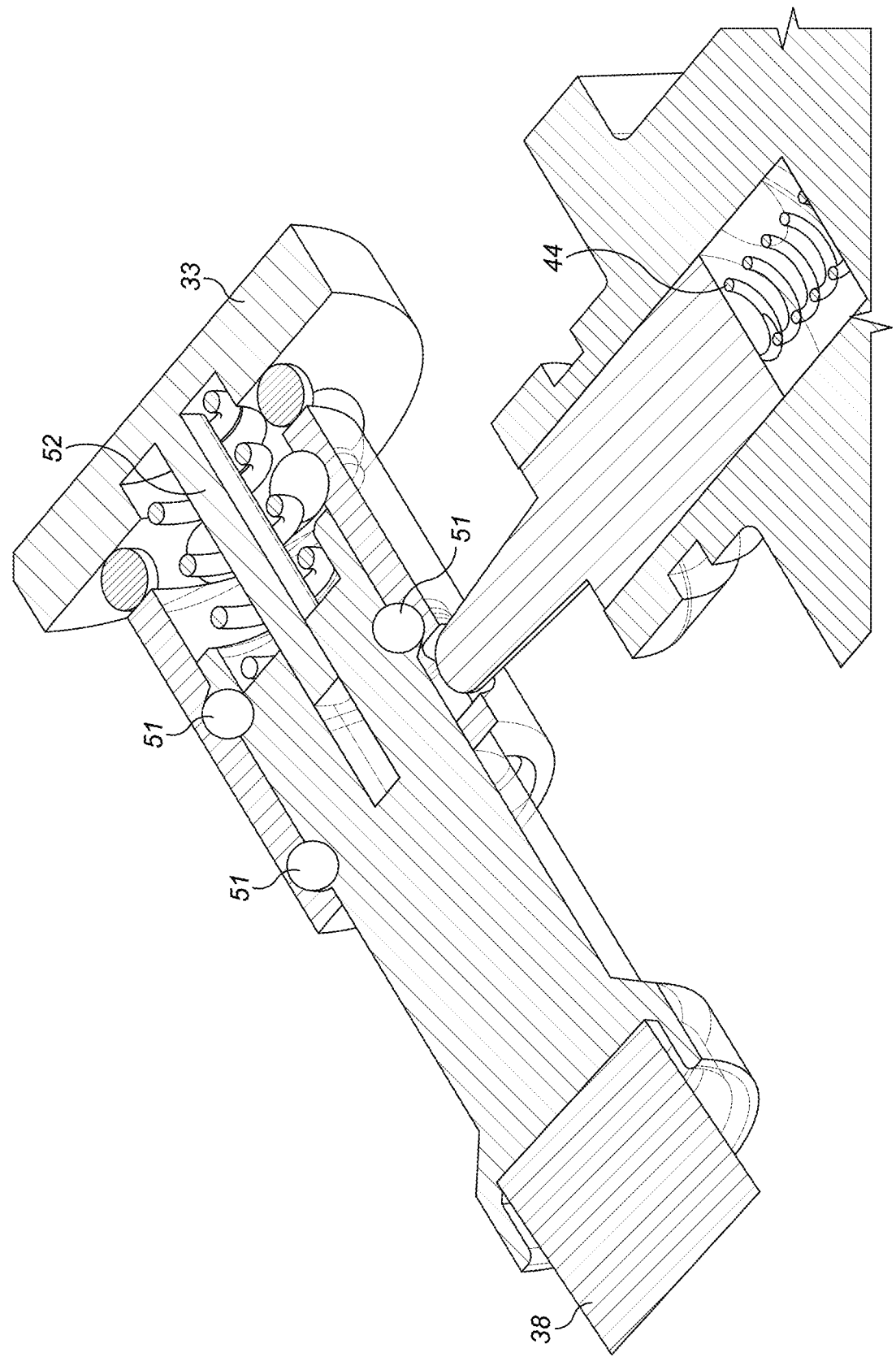
FIG. 6 is a section view of an alternative embodiment.

In the embodiment described and shown in FIGS. 3, 4 and 5, the bushing 37 and piston 39 engage via a male helical thread on the piston. Alternatively, the piston may have a female thread as shown in FIG. 6, in which case ball bearings 51 are provided in the thread as shown.

To further reduce friction, a female thread can be provided on both the rotary bushing 37 and on the piston 39. The ball bearings 51 can transfer forces between the two parts. This can significantly reduce friction forces.

To further prevent rotation of the piston about its own axis, a guide rail 52 can be provided which may be arranged in a channel in the piston and may have a non-circular profile to prevent rotation of the piston relative to the guide rail. In the embodiment shown the end of the guide rail 52 is attached to the assembly housing 33.

The example shown comprises a single solenoid. It is also possible to have two or perhaps even more solenoids arranged in parallel (or coaxially) to provide redundancy and extra engagement force. If two solenoids are used, the release mechanism reacts more quickly and meets the requirements of aviation regulations for the duplication of critical systems.

An alternative embodiment could have a push-type solenoid, rather than a pull-type solenoid, in which case the solenoid would be in the locked position when the solenoid was energised and in the unlocked position when the solenoid was de-energised.

The arrangement of the present release mechanism requires significantly fewer component parts as compared to the linkage system of the prior art, which, in turn, reduces the manufacturing, assembly and testing costs and avoids the need for shims as in the prior art systems. This can result in a more reliable and smaller deployment system, as smaller forces have to be overcome by the solenoid. Further, as some of the force acting on the mechanism in the locked position is distributed onto the assembly housing wall, the solenoid plunger does not have to take the full force of the lock bolt spring, thus reducing the risk of damage to the solenoid assembly.

This mechanism could be easily adapted to existing actuators.

The above is a description of a single embodiment by way of example only. Modifications may be made without departing from the scope of this disclosure.

While the apparatus has been described in the context of unlocking a RAT actuator, it may, as mentioned above, find use in other applications, for example of the types of actuator, valves, pumps or the like.

The invention claimed is:

1. A locking mechanism for releasably locking a lock bolt against axial movement, the mechanism comprising:
   an axially moveable member, arranged to move axially with the lock bolt;
   biasing means, arranged to bias the axially moveable member towards the lock bolt;
   rotation means in threaded engagement with the axially moveable member such that rotation of the rotation means causes axial movement of the axially moveable member, and
   an actuator assembly arranged to prevent rotation of said rotation means in a locked state, the actuator assembly comprising:
      a plunger having a tip and a drive means arranged to cause movement of the plunger relative to the rotation means, the actuator assembly arranged such that in a locked state the drive means causes the tip to engage with the rotation means such as to prevent rotation thereof, thus preventing axial movement of the axially moveable member.

2. The locking mechanism of claim 1, wherein the actuator assembly comprises a solenoid assembly, the plunger is a solenoid plunger, the tip is a solenoid plunger tip and the drive means is a solenoid.

3. The locking mechanism of claim 2, wherein, in the locked state, the solenoid is not energised and in an unlocked state in which the tip does not engage with the rotation means, the solenoid is energised.

4. The locking mechanism of claim 2, wherein, in the locked state, the solenoid is energised and in a second state in which the tip does not engage with the rotation means, the solenoid is not energised.

5. The locking mechanism of claim 1, wherein the tip engages with the rotation means by protruding into a detent provided on the rotation means.

6. The locking mechanism of claim 1, wherein the biasing means is a spring.

7. The locking mechanism of claim 1, wherein the rotation means is a bushing.

8. The locking mechanism of claim 1, wherein said axially moveable member comprises a piston in moveable engagement with the lock bolt.

9. The locking mechanism of claim 1, wherein the mechanism comprises two such actuator assemblies.

10. An actuator assembly comprising an axially moveable lock bolt and a locking mechanism as claimed in claim 1.

11. A method of releasably locking a lock bolt against axial movement comprising activating an actuator drive means to move a plunger towards a bushing around an axially moveable member such that a tip of the plunger engages the bushing to prevent rotation of the bushing and hence axial movement of the moveable member.

12. The method of claim 11, wherein activating the actuator drive means comprises deenergizing a solenoid.

13. The method of claim 11, wherein activating the actuator drive means comprises energizing a solenoid.

* * * * *